(12) United States Patent
Mysore et al.

(10) Patent No.: US 8,042,122 B2
(45) Date of Patent: Oct. 18, 2011

(54) HYBRID RESOURCE MANAGER

(75) Inventors: Shivaram H. Mysore, Kirkland, WA (US); Dan Sledz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1147 days.

(21) Appl. No.: 11/823,239

(22) Filed: Jun. 27, 2007

(65) Prior Publication Data

US 2009/0007153 A1    Jan. 1, 2009

(51) Int. Cl.
*G06F 3/00* (2006.01)
*G06F 9/44* (2006.01)
*G06F 9/46* (2006.01)
*G06F 13/00* (2006.01)
*G06F 12/00* (2006.01)
*G06F 7/04* (2006.01)

(52) U.S. Cl. ........ 719/328; 719/321; 710/200; 710/240; 726/2

(58) Field of Classification Search .......................... None
See application file for complete search history.

(56) References Cited

U.S. PATENT DOCUMENTS

| | | |
|---|---|---|
| 6,216,196 B1 | 4/2001 | Elwell et al. |
| 6,760,784 B1 | 7/2004 | Bodin et al. |
| 6,766,519 B1 | 7/2004 | Burriss et al. |
| 7,069,206 B2 | 6/2006 | Movall et al. |
| 7,117,503 B2 | 10/2006 | Camara et al. |
| 7,207,041 B2 | 4/2007 | Elson et al. |
| 7,760,402 B2 * | 7/2010 | Higuchi et al. ............... 358/401 |
| 2005/0044205 A1 | 2/2005 | Sankaranarayan et al. |
| 2005/0060409 A1 | 3/2005 | Dube et al. |
| 2006/0026588 A1 | 2/2006 | Illowsky et al. |
| 2006/0130072 A1 | 6/2006 | Rhoten et al. |
| 2006/0190482 A1 | 8/2006 | Kishan et al. |
| 2006/0236368 A1 | 10/2006 | Raja et al. |
| 2006/0238789 A1 | 10/2006 | Pesar |
| 2006/0291406 A1 | 12/2006 | Booth et al. |
| 2007/0083868 A1 | 4/2007 | Sankaranarayan et al. |
| 2007/0083873 A1 * | 4/2007 | Roychoudhury et al. .... 719/321 |
| 2008/0189775 A1 * | 8/2008 | Fujita ............................... 726/7 |

OTHER PUBLICATIONS

"Microsoft Computer Dictionary", 2002, Microsoft Press, Fifth Edition, p. 499.*

Bruce Thompson, et al. "DSP Resource Manager Interface and its Role in DSP Multimedia" 94 International Conference Proc. Combined Volumes pp. 291-298, May 10-12, 1994.

James Leslie Benjamin, "Mungi Device Drivers", Date: Nov. 2002, p. 1-117, Jan. 7, 2011.

Stewart David B., "An I/O Device Driver Model and Framework for Embedded Systems", Date: Dec. 1997, pp. 1-8, in Proceeding of Workshop on Middleware for Distributed Real-Time (MDRTSS), San Francisco, CA.

Vaughan, et al., "On device abstractions for portable, reusable robot code", Date: Oct. 2003, pp. 2121-2427, In Proceedings of the IEEE/RSJ International Conference on Intelligent Robots and Systems (IROS 2003), Las Vegas, Nevada.

* cited by examiner

*Primary Examiner* — Qing Wu
(74) *Attorney, Agent, or Firm* — Mayer & Williams P.C.

(57) ABSTRACT

A hybrid resource manager is provided for use in a computing environment. The hybrid resource manager serves as the single resource manager that cooperates with an operating system to manage each of the individual device drivers associated with the various functions of a multifunction hardware device. In one example the hybrid resource manager implements a consistent management and policy framework to prevent conflicts from arising when multiple functions are simultaneously requested by various applications.

18 Claims, 5 Drawing Sheets

FIG. 5

HYBRID RESOURCE MANAGER

BACKGROUND

Operating systems employ resource management schemes to limit the interference between applications, implement policies that prioritize and otherwise control resource allocations, and generally manage the overall behavior of a system that is running many independent software applications. Usually, a resource manager is provided for each class of devices. Examples of such device classes include, peripheral devices such as keyboards, printers, facsimile machines, scanners, CD and DVD players, network interfaces, smartcard readers, biometric scanners, and memory storage devices (e.g., flash memory). Each of the different classes of devices typically have their own resource manager. Because particular devices within a given class are generally slightly different from one another, an additional software component known as the device driver is commonly provided with each particular hardware device. The device driver acts as a translation layer between the resource manager and the particular hardware device.

Device drivers are commonly used in computer systems as the lowest level software component to communicate with hardware devices. Typically, these device drivers are associated with the devices they control in a one-to-one relationship. For example, a serial port driver is associated with the data/fax serial modem of the computer, an Integrated Switched Digital Network (ISDN) driver is associated with an ISDN interface device, and a network driver provides the interface to a Wide Area Network (WAN) data interface device. In such an arrangement, each dedicated driver manages the start-up, shutdown, maintenance, and functional operations for the hardware device.

Due to advances in technology, it has become possible to integrate multiple hardware devices into a single multifunction device. For example, a single hardware device may be capable of performing one or all of the functions of a data/fax modem, ISDN, and WAN interface. Another example may be a keyboard that has an integrated smart carder reader and a biometric scanner. Such multifunction devices have several advantages over multiple single function devices, including reduced cost, smaller size, reduced load on the host system and easier installation. However, to remain compatible with legacy applications, these multifunction devices still require dedicated drivers for each function, e.g., keyboard, smart card reader, and biometric scanner, etc. Since each device driver functions independently, situations can arise in which multiple device drivers send commands to the single hardware device. Thus, there exists the possibility that the commands sent by one driver may conflict with the commands sent by another driver, resulting in a system malfunction. For example, one driver may send a command to shutdown the hardware device while other independent drivers are using the device. Another example is where one driver attempts to run a diagnostic test that requires exclusive access to the multifunction device to ensure valid results, and another driver attempts to access the multifunction device during this diagnostic test. There are numerous conflicts that can occur with multiple device drivers accessing a single multifunction hardware device.

Figure 1:
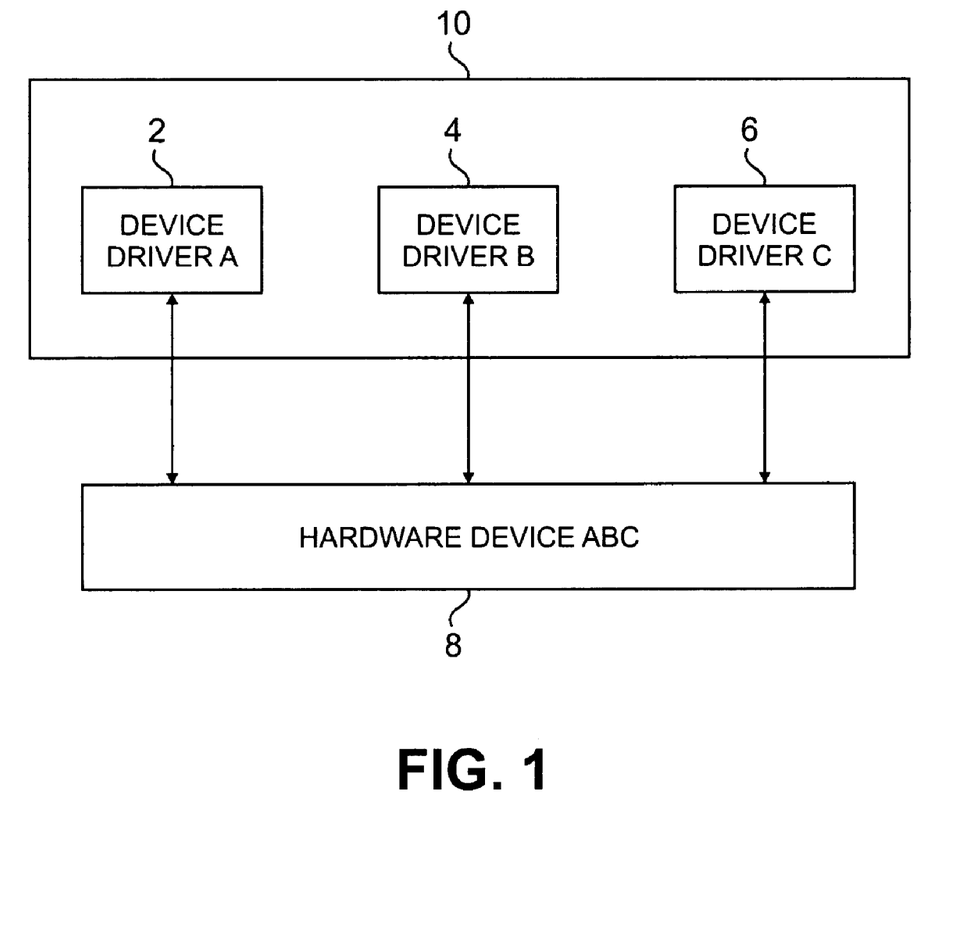
FIG. 1 illustrates a computer system having multiple device drivers for use with a multifunction hardware device.

FIG. 1 illustrates a computer system 10 having a plurality of device drivers, i.e., device driver A 2, device driver B 4, and device driver C 6 being connected to a multifunction device 8. In operation, an application residing on computer system 10 may request a first function to be carried out by multifunction device 8. When a function is requested, computer system 10 directs the driver corresponding to the requested function to send commands to multifunction device 8 in order for it to perform the requested function. For example, if function A is requested, computer system 10 directs device driver A 2 to send commands to multifunction device is 8 to perform function A. However, as described above, some device drivers may issue conflicting commands to the multifunction device. Conflicting commands being sent from different drivers may result from numerous scenarios in a system with a multifunction device. For example, while multifunction device 8 is being directed to perform function A by device driver A 2, computer system 10 may direct device driver B 4 to issue commands to multifunction device 8 to perform function B. Part of the commands issued by device driver B 4 may be device initialization commands which conflict with the commands being issued by device driver A 2. In such cases, the multifunction device may not perform some or all of the requested functions because of the conflict.

In addition to conflicts, another problem that arises when multiple drivers are used with a multifunction device concerns security. For example, it is often necessary to ensure that at any given time, an application is using only one specific function of the multifunction device 8 and that all others are locked down.

One possible solution to this problem is to combine the device drivers into a single multifunction driver, and thereby prevent conflicting commands using programmatic methods. However, this approach may require that a large portion or all of the software code of the existing drivers be rewritten to be able to work as a single driver. This solution also reduces the modularity of the software. A single combined driver is larger and more complex, and therefore is more difficult to create, test, maintain, and upgrade. Combining multiple drivers into a single multifunction driver can increase the total number of drivers required, when all the different permutations and combinations of drivers and multifunction devices are considered. Thus, it is highly desirable to keep the drivers separate.

SUMMARY

The following Detailed Description presents a hybrid resource manager for use in a computing environment. The hybrid resource manager serves as the single resource manager that cooperates with an operating system to manage each of the individual device drivers associated with the various functions of a multifunction hardware device. In one example the hybrid resource manager implements a consistent management and policy framework to prevent conflicts from arising when multiple functions are simultaneously requested by various applications.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

To successfully run an application on a computing device, the device's operating system must provide the application with various resources. A computing system suitable for implementing an improved method for managing those resources to facilitate their efficient allocation and use is described in detail in the following discussion.

The resource management architecture described herein may be implemented in many diverse environments and computing contexts. For discussion purposes, the architecture is described in the context of a computing system for the personal computer, but is equally applicable to other computing environments, including a wide variety of electronic devices such a game console, cellular telephone, PDA, set-top box (STB), and the like.

As detailed below, instead of providing a single multifunction driver that is used to support a multifunction hardware device, a hybrid resource manager is provided. The hybrid resource manager can be used with the individual device drivers of a multifunction hardware device, yet provide a consistent management and policy framework that can be used by all applications that access the hardware device.

Figure 2:
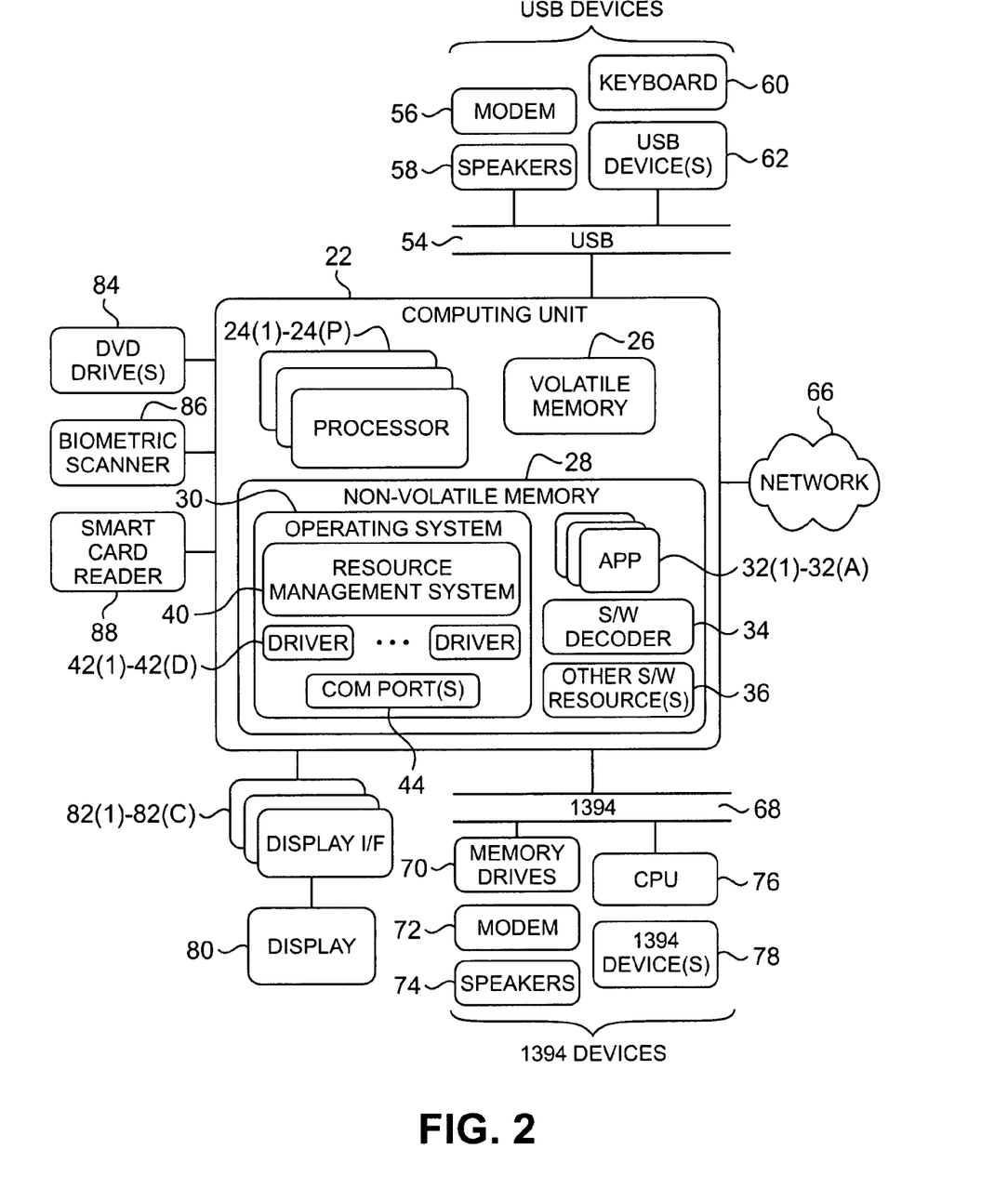
FIG. 2 shows a computing system having a computing unit and multiple peripheral components that connect or otherwise interface with the computing unit.

FIG. 2 shows a computing system 20 having a computing unit 22 and multiple peripheral components that connect or otherwise interface with the computing unit 22. The computing unit 22 has one or more processors 24(1), 24(2), . . . , 24(P), volatile memory 26 (e.g., RAM), and non-volatile memory 28 (e.g., ROM, Flash, hard disk, CD ROM, etc.).

An operating system 30 is stored in non-volatile memory 28. The operating system 30 is a multi-tasking operating system that, when loaded into volatile memory 26 and executed on one or more processors 24, supports simultaneous execution of multiple applications 32(1), 32(2), . . . , 32(A). One preferred operating system is a Windows™-brand operating system sold by Microsoft Corporation. It is noted, however, that other operating systems may be employed.

Applications 32(1), 32(2), . . . , 32(A) are examples of different resource consumers that can be loaded and executed on the system, which require access to hardware resources. Resource consumers may include applications such as word processing applications, spreadsheet applications, database applications, scheduling applications, financial applications, educational applications, entertainment applications and so forth.

The operating system 30 has a resource management system 40 that manages the resources of the computing system 20 for allocation to the applications 32(1)-32(A). The resource management system 40 may be implemented separately from the operating system 30, but is illustrated in this example as being integrated within the operating system. The resource management system 40 is described below in more detail with reference to FIG. 3.

The operating system 30 also has multiple software drivers 42(1), . . . , 42(D) for various associated peripheral components in the computing system 20. One or more COM (communication) ports 44 are also illustrated as being part of the operating system 30. A representative collection of peripheral components is illustrated surrounding the computing unit 22.

A USB bus 54 is connected to the computing unit 22 to interface many different kinds of USB compatible peripheral components. Examples of such components include a modem 56, speakers 58, keyboard 60, and other USB devices 62. The computing unit 22 is also coupled to a network 66 to interface with other computers. The network 66 is representative of many diverse types of networks, including LANs, WANs, Internet, intranets, and wireless networks.

A 1394 serial bus 68 is connected to the computing unit 22 to interface many different kinds of 1394 compatible peripheral components. Examples of such components include memory drives 70 (e.g., disk drive, tape drive, CD ROM drive, etc.), modem 72, speakers 74, a CPU (central processing unit) 76, and other 1394 devices 78. It is noted that although USB and 1394 buses are shown in this exemplary system, other bus architectures may be additionally or alternatively used, such as SCSI, ISA (Industry Standard Architecture), and PCI (Peripheral Component Interconnect) buses.

The computing system 20 has a display 80, which may be a television set or a computer monitor. The display is interfaced with the computing unit 22 via one or more display interfaces 82(1), 82(2), . . . , 82(C), which are representative of a video port, overlay, and video memory. Other exemplary peripheral devices coupled to the computing unit 22 may include DVD player 84, biometric scanner 86 and smart card reader 88.

The collection of components illustrated in FIG. 2 shows exemplary types of resources that are managed by the resource management system 40. Among them are various hardware device resources such as a keyboard, modem, USB devices, a biometric scanner, a smart card reader, 1394 devices, display interfaces, recorders, memory drives, and so on. Many other components may be added to the system, and one or more of the illustrated components can be removed. As previously mentioned, it is becoming more and more common to combine the functionality of two or more of these devices into a single multifunction hardware device.

Figure 3:
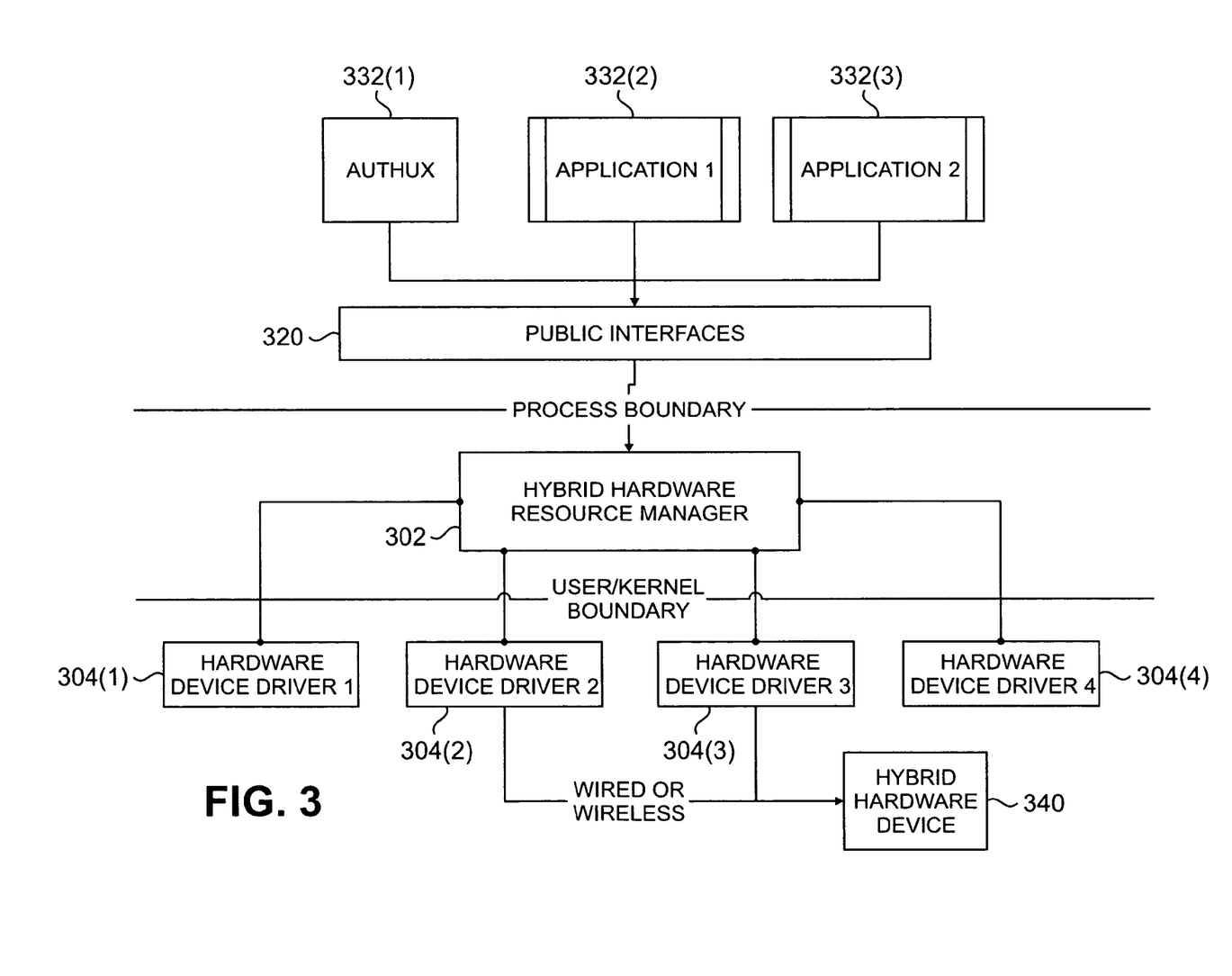
FIG. 3 shows one example of a resource management architecture that may be implemented by the computing system of FIG. 2 to facilitate resource management of a multifunction hardware device.

FIG. 3 shows one example of a resource management architecture 300 that may be implemented by the computing system 20 of FIG. 2 to facilitate resource management of a multifunction hardware device. The architecture 300 is implemented in software, and in this example, includes components at the user level as well as components at the kernel level. The architecture 300 has a hybrid resource manager 302 and device drivers 304(1), 304(2), 304(3), . . . , 304(P), which support one or more resource consumers. Examples of resource consumers include user-level resource consumers, such as applications 332(1), 332(2), 332(3) . . . , 332(N). As shown, one application level resource consumer that may be provided is an authentication user interface 332(1) for providing application level authentication and security to ensure, for example, that a Trojan or other malware does not spoof or otherwise gain access to the user's credentials such as a password, public key or the like. Although not shown, kernel-level resource consumers may also be provided.

Each device driver 304(1)-304(4) is associated with a hardware device and tracks the availability of the hardware device. That is, as noted above, a device driver can be any software component or module that interfaces with a hardware device. Device driver 304(1) may be, for example, a serial driver to allow multifunction device 340 to pass serial data to a modem. Device driver 304(2) may be, for example, an ISDN interface driver to allow a multifunction device 340 to originate and receive calls, and device driver 304(3) may be, for example, a WAN driver to allow multifunction device 340 to send and receive data to a WAN network interface device. Another example of a multifunction device may be a keyboard that that integrates a smart card reader with flash memory and a biometric reader. In this case device driver 304(1) may be a keyboard, device driver 304(2) may be a smart card driver, device driver 304(3) may be a biometric scanner driver, and device driver 304(4) may be a flash memory driver. Yet another multifunction device may be a Virtual Private Network (VPN) card that combines a WAN data interface, an X.25 data interface, and a data encryption processor. These device drivers may be very complex and, as previously stated, are generally best implemented as independent drivers. Of course, the above described multifunction devices and device drivers are only exemplary and the principles described herein can be applied to any multifunction hardware device and the drivers used to interface with these devices. Those skilled in the art will understand that as technology advances more hardware functions will become available and it will become possible to combine numerous hardware functions into a single device, and that the principles described herein may be applied equally to these later developed multifunction devices and device drivers. Although the device drivers are illustrated at the kernel level, one or more device drivers may also be implemented at the user level.

Each device driver 304 registers itself with the hybrid resource manager 302 and supplies a set of callbacks used by the hybrid resource manager 302 to get information. For example, one callback is used to perform resource calculations and another is used to notify the provider of successful reservations. The hybrid resource manager 302 allows the same context to be used for a hybrid hardware device and get corresponding device class handles that are used by the specific device resource manager for that function performed by the hardware device.

The hybrid resource manager 302 exposes a public interface 320 to interact with other modules in the architecture. The public interface 320 includes defined APIs (application program interfaces) having a set of provider API calls used by the device drivers 304 and a set of consumer API calls to accept requests for resources from the applications 332(1)-332(N) or other resource consumers. An API is an interface to a program that defines the sort of inputs the program will accept to perform a desired task and the sort of outputs the program will return after the performance of the desired task. When an application 332 wants to perform a task, it uses the public interface 320 to create an activity at the hybrid resource manager 302 and build one or more configurations describing various sets of resources required to perform the activity. An activity is a data structure associated with a task being performed in the system. The hybrid resource manager 302 decides which activities can be satisfied in their entirety from the limited pool of resources and allows the applications with activities that can be satisfied to have access to the requested resources.

Figure 4:
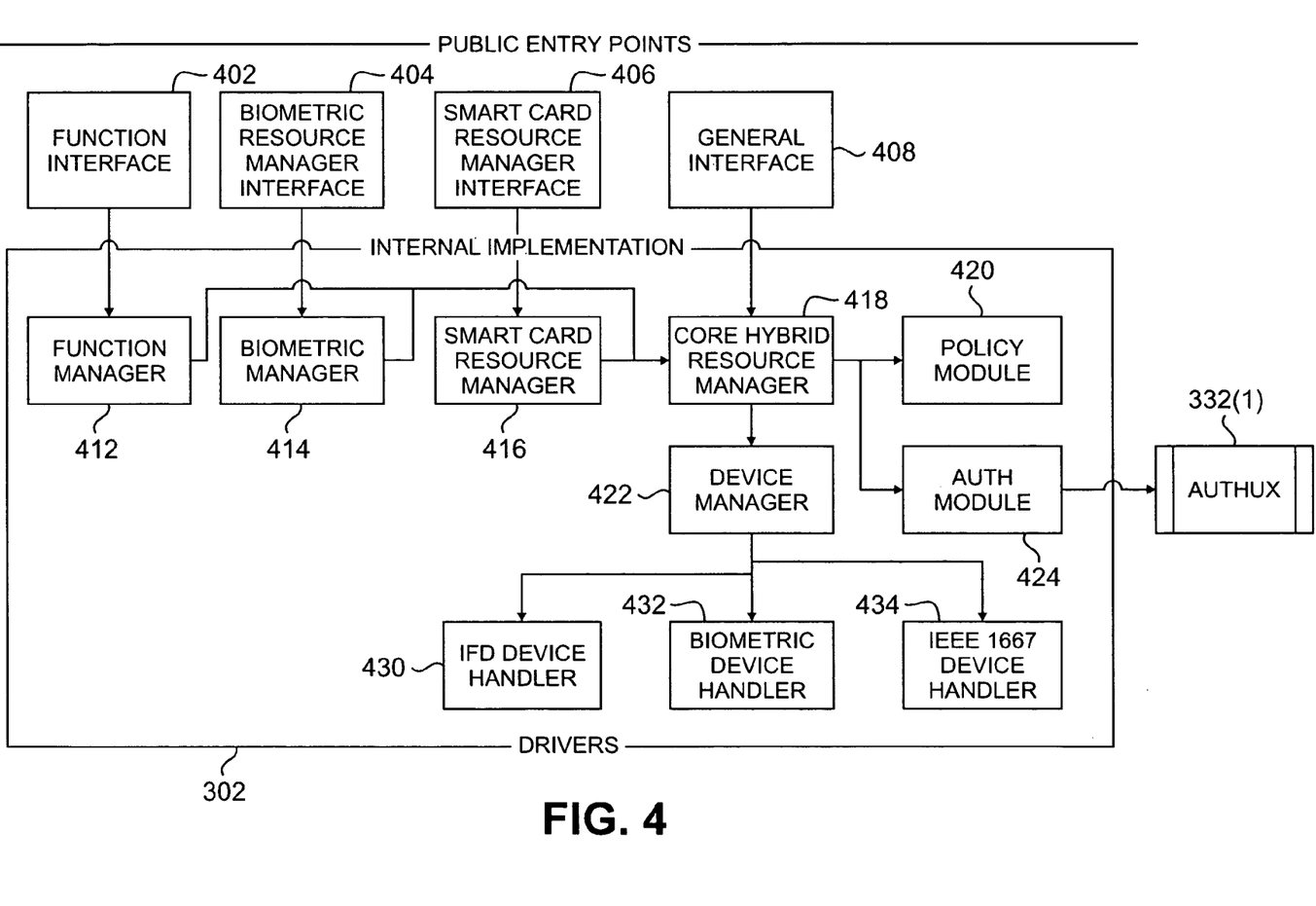
FIG. 4 shows one particular example of the hybrid resource manager depicted in FIG. 3.

FIG. 4 shows one particular example of the hybrid resource manager 302 depicted in FIG. 3 in which multiple public interfaces are provided for purposes of supporting backward compatibility with existing applications. Access to the hybrid resource manager 302 is obtained through a public interface (e.g., public interface 320 in FIG. 3) that comprises a series of interfaces that are compliant with an appropriate API standard. In this example, for instance, standard APIs 404 and 406 are shown for a biometric reader and smart card reader, respectively. A function interface 402 is also shown, which represents any other hardware device functionality (e.g., flash storage) that may be available from a trusted third party. These interfaces do not access hardware devices directly. Since these interfaces 402, 404 and 406 are the same as those currently employed to gain access to the resource managers, backward compatibility is maintained. Contexts that are opened through the public interface 320 might not have complete access to all the underlying system hardware because of policies that can be established by a policy module, which is discussed in more detail below. In some cases the hybrid Resource Manager 302 has a context structure that maintains a list of all the device class IDs supported by the hardware device and the corresponding context.

The public interface also includes a generic hybrid resource manager interface 408 that is used to facilitate implementation of the enhanced functionality of the hybrid resource manager 302. That is, the generic hybrid resource manager interface 408, which may also be implemented as an API, is used by applications that can take advantage of the features of the hybrid resource manager 302. The generic hybrid resource manager interface 408 provides such functions as: hybrid devices enumeration, for devices within a hybrid device, which identifies the number and types of different functions offered by a hardware device; device acquisition, which is used by the computing system and the hardware device for verification and authentication purposes; and device locking, which ensures that after a multifunction hardware device is acquired, applications (e.g., applications 332) are given appropriate and perhaps exclusive access to it for a particular operation.

The generic hybrid resource manager interface 408 helps enable communication between and among different device Resource Managers and hence devices (via device drivers) (e.g., device drivers 304). The generic hybrid resource manager interface 408 also allows contexts to be opened in a restricted view, which means that contexts could be a subset of the functionality available if opened through the actual public APIs The hybrid resource manager 302 also includes dedicated resource managers that are accessed through the interfaces. In the example shown in FIG. 3, a function manager 412, biometric manager 414 and a smart card resource manager 416 are accessed through the function interface 402, biometric interface 404 and smart card interface 406, respectively. Each of these interfaces is extensible but integrity verified in accordance with security procedures established by the policy module, discussed below. The dedicated resource managers 412, 414 and 416 allow backwards compatibility and largely provide the same functionality as the current resource managers, but retrofitted in certain key areas such as context allocation, external resource locking and hardware management.

The core hybrid resource manager 418 is responsible for managing access between different Resource Managers and hence devices used by the multifunction hardware device and applications that are capable of using the hybrid resource manager architecture. Each of the dedicated resource managers 412, 414 and 416 is responsible for their respective connection to the core hybrid resource manager 418. The core hybrid resource manager 418 is made extensible to facilitate the production of additional functionality and to handle new type of hybrid hardware devices that may be developed. The core hybrid resource manager 418 arbitrates access to the resources (local or remote) provided by the device drivers. Resource consumers, such as applications 332 in FIG. 3, request sets of one or more resources provided by the drivers, and the core hybrid resource manager 418 determines which applications get to use which resources of the device drivers. The core hybrid resource manager 418 can make resource allocation decisions based on a predetermined conflict resolution mechanism.

The core hybrid resource manager 418 enforces security and other policies established by the policy module 420. The policy module 420 can receive policies that are to be established from the device or system level (ex. Group or local machine policy). One example of a policy that may be implemented is as follows. In the case a multifunction device that includes a smart card reader and a biometric scanner, for instance, a policy may be established that requires the exclusive use of a smart card reader with an integrated biometric scanner. If a user attempts to use a dedicated smart card reader and a physically separate biometric scanner, the policy module 420 would prevent the two devices from being acquired. Of course, the policy module 420 may establish many other policies that ensure that a hybrid hardware device operates properly without conflicts and the like. For instance, with respect to conflict resolution, if the hybrid resource manager 302 is employing a priority based resolution, the policy module 420 ranks tasks a priori according to their relative importance ascribed by the user or system so that the core hybrid resource manager 302 may determine which task should get access to resources when there is a conflict such that not all tasks can be allocated their resources. Other viable policies include first reservations win, most recent reservations win, "fair" sharing of resources, user picks what wins over what, and so forth. Many different policies are possible. The system or user sets the policies and the policy manager module translates them into absolute priorities.

The hybrid resource manager 302 may include a variety of other modules such as those additional modules shown in FIG. 3. For example, an authentication module 424 may be provided for the purpose of centralizing authentication of hardware devices so that a separate authentication process does not need to be performed each and every time a different application attempts to access the hybrid hardware device. The authentication module may be invoked on behalf of the application (as a result of a context call) or by a device manager module 422 on behalf of the hybrid hardware device. In addition, the device manager module 422 monitors and manages the hybrid hardware devices. The device manager module 422 can also lock down resources at the hybrid hardware device and functionality level.

The device function handlers such as handlers 430, 432 and 434 manage the detailed communication protocols between the hybrid resource manager 302 and the hybrid hardware devices using input/output control codes. An authentication user interface or user experience module may also be provided to integrate the various levels of user authentication that may be needed and to provide a consistent interface for the user. Such authentication may be provided, for example, at the user, system and/or hardware device level.

Figure 5:
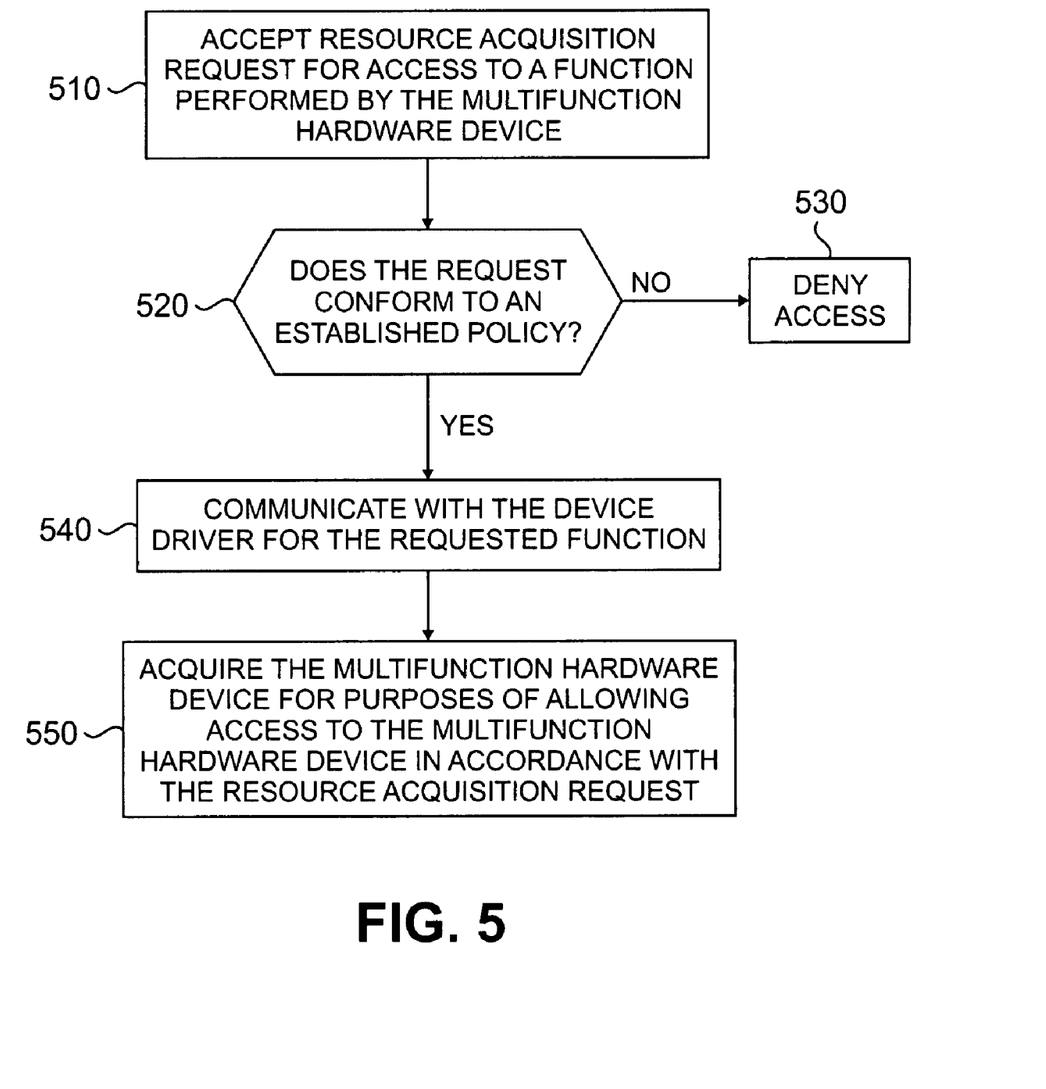
FIG. 5 is flowchart showing one example of a method for facilitating management of hardware resources that are used by a computing system.

FIG. 5 is flowchart showing one example of a method for facilitating management of hardware resources that are used by a computing system. The method begins in step 510 when the generic hybrid resource manager interface accepts a resource acquisition request for access to any individual function performed by a multifunction hardware resource. In decision step 520 a determination is made whether the resource acquisition request conforms to a policy established for functions offered by the multifunction hardware resource. If not, then access is denied in step 530. If it does conform to the policy, in step 540 the hybrid resource manager communicates with a device driver associated with the multifunction hardware resource and dedicated to the requested individual function. Responsive to the communication with the device driver, in step 550 the hybrid resource manager causes the multifunction hardware device to be acquired for purposes of allowing access to the multifunction hardware device in accordance with the resource acquisition request.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for facilitating management of hardware resources used by a computing system, comprising:
    accepting a resource acquisition request from a resource consumer through a multifunction API, to access any individual function performed by a multifunction hardware device, wherein the multifunction API is configured to facilitate (i) device enumeration of functions performed by the multifunction hardware device and (ii) device acquisition for authentication and verification purposes and (iii) locking of the multifunction hardware device after acquisition thereof;
    communicating with a device driver associated with the multifunction hardware device and dedicated to the requested individual function; and
    responsive to communication with the device driver, acquiring the multifunction hardware device to allow access to the multifunction hardware device in accordance with the resource acquisition request.

2. The method of claim 1 further comprising determining if the resource acquisition request conforms to a policy established for the functions performed by the multifunction hardware device.

3. The method of claim 2 further comprising denying acquisition of the multifunction hardware device if a policy conflict arises between a first resource consumer requesting a first function performed by the multifunction hardware device and a second resource consumer requesting a second function performed by the multifunction hardware device.

4. The method of claim 1 wherein the resource acquisition request is received from an application-level resource consumer.

5. A system for managing hardware resources used by a computing device, comprising:
    a multifunction hardware device;
    a public interface accepting consumer function calls from resource consumers for each function performed by the multifunction hardware device;
    a hybrid resource manager for allocating different functional resources of the multifunction hardware device in response to the consumer function calls by managing different device drivers dedicated to each of the functions performed by the multifunction hardware device;
    a plurality of device handlers for implementing communication protocols between the hybrid resource manager and the device drivers, wherein each of the device handlers is dedicated to a different functional resource of the multifunction hardware device; and
    a policy module for establishing at least one predetermined policy to be implemented by the hybrid resource manager to allow acquisition of the multifunction hardware device to allow access to the multifunction hardware device in accordance with the consumer function calls.

6. The system of claim 5 further comprising:
at least one dedicated interface accepting requests from select resource consumers for one particular function performed by the multifunction hardware device, wherein the at least one dedicated interface allows contexts that are a subset of the functionality available if opened through the public interface; and
at least one dedicated resource manager for allocating resources for the particular function by managing a device driver dedicated to the particular function.

7. The system of claim 6 wherein the dedicated interface conforms to an API standard associated with the particular function performed by the multifunction hardware device.

8. The system of claim 5 wherein the public interface is configured to facilitate (i) device enumeration of the functions performed by the multifunction hardware device and (ii) device acquisition for authentication and verification purposes and (iii) locking of the multifunction hardware device after acquisition thereof.

9. The system of claim 5 wherein the policy module is configured to establish a predetermined conflict resolution policy for implementing resource allocation.

10. The system of claim 9 wherein the predetermined conflict resolution policy includes a priority-based resolution.

11. The system of claim 5 further comprising an authentication module for centralizing authentication of the multi function hardware device.

12. The system of claim 11 further comprising a device manager module for accepting content calls on behalf of the multi function hardware device to invoke the authentication module.

13. The system of claim 11 wherein the authentication module is configured to present a common authentication user interface independent of the functional resources being allocated.

14. The system of claim 5 wherein the hybrid resource manager resides at a system level within an operating system.

15. The system of claim 5 wherein the computing device is an electronic device selected from the group consisting of a personal computer, game console, cellular telephone, PDA, and set-top box (STB).

16. A computer-readable storage medium containing instructions which, when performed by one or more processors disposed in an electronic device, implement an operating system having a resource manager performing a method comprising:
accepting a resource acquisition request for access to any individual function performed by a multifunction hardware device;
using one of a plurality of device handlers to implement communication protocols between a hybrid resource manager and device drivers, wherein each of the device handlers is dedicated to a different functional resource of the multifunction hardware resource, and the device handler used is the one that corresponds to a device driver dedicated to the individual function performed by the requested multifunction hardware device;
communicating with the device driver associated with the multifunction hardware device and dedicated to the requested individual function; and
responsive to communication with the device driver, acquiring the multifunction hardware device to allow access to the multifunction hardware device in accordance with the resource acquisition request.

17. The computer-readable medium of claim 16 further comprising determining if the resource acquisition request conforms to a policy established for functions offered by the multifunction hardware device.

18. The computer-readable medium of claim 17 further comprising denying acquisition of the multi function hardware device if a policy conflict arises between a first resource consumer requesting a first function performed by the multi function hardware device and a second resource consumer requesting a second function performed by multifunction hardware device.

* * * * *